United States Patent [19]
Kikuta et al.

[11] Patent Number: 6,102,510
[45] Date of Patent: Aug. 15, 2000

[54] RECORDING HEAD SYSTEM FOR INK JET RECORDING APPARATUS AND METHOD FOR DRIVING THE SAME

[75] Inventors: Masaya Kikuta, Tokyo; Akira Katayama, Yokohama; Hideaki Kishida, Yamato; Kimiyuki Hayasaki, Yokohama, all of Japan

[73] Assignee: Canon Kabushiki Kaisha, Tokyo, Japan

[21] Appl. No.: 07/999,129

[22] Filed: Dec. 31, 1992

[30] Foreign Application Priority Data

Jan. 9, 1992 [JP] Japan .................................. 4-002359

[51] Int. Cl.⁷ .................................................. B41J 29/38
[52] U.S. Cl. .................................. 347/9; 347/12; 347/13; 347/57; 347/180
[58] Field of Search .................................. 347/9, 12, 13, 347/57, 180, 181, 182

[56] References Cited

U.S. PATENT DOCUMENTS

| | | |
|---|---|---|
| 4,026,401 | 5/1977 | Doane .................................. 347/5 X |
| 4,313,124 | 1/1982 | Hara . |
| 4,345,262 | 8/1982 | Shirato et al. . |
| 4,459,600 | 7/1984 | Sato et al. . |
| 4,463,359 | 7/1984 | Ayata et al. . |
| 4,558,333 | 12/1985 | Sugitani et al. . |
| 4,723,129 | 2/1988 | Endo et al. . |
| 4,740,796 | 4/1988 | Endo et al. . |
| 4,910,528 | 3/1990 | Firl et al. . |
| 5,043,748 | 8/1991 | Katayama et al. . |
| 5,164,743 | 11/1992 | Hayashi et al. . |
| 5,173,717 | 12/1992 | Kishida et al. . |

FOREIGN PATENT DOCUMENTS

| | | |
|---|---|---|
| 0103943 | 3/1984 | European Pat. Off. . |
| 0205243 | 12/1986 | European Pat. Off. . |
| 0440492 | 8/1991 | European Pat. Off. . |
| 0440500 | 8/1991 | European Pat. Off. . |
| 54-056847 | 5/1979 | Japan . |
| 59-123670 | 7/1984 | Japan . |
| 59-138461 | 8/1984 | Japan . |
| 60-071260 | 4/1985 | Japan . |
| 61-054958 | 3/1986 | Japan ..................................... 347/180 |

*Primary Examiner*—N. Le
*Assistant Examiner*—Hai C. Pham
*Attorney, Agent, or Firm*—Fitzpatrick, Cella, Harper & Scinto

[57] ABSTRACT

A recording head system for an ink jet recording apparatus having a full-line recording head. The recording head is divided into a variable number of blocks. The recording ratio of each block (that is, the ratio of the number of ink ejecting elements to be driven in a block in accordance with recording data to the total number of the ink ejecting elements in the block) is compared with a reference recording ratio. When the recording ratio is greater than the reference recording ratio, the interval between the drive timing of a block and that of the next block is lengthened, or vise versa. This is performed by controlling the enable timing of each block by D-flip-flops, AND gates and delay circuits. Unevenness of recorded images resulting from the fluctuation in periodic ink pressure can be ameliorated.

22 Claims, 17 Drawing Sheets

RANDOM BIT SELECTING DATA

```
              ● ○ ○ ○|● ○ ○ ○|● ○ ○ ○|● ○ ○ ○|● ○ ○ ○|● ○ ○ ○
1ST LINE
  (4 BIT     ○ ● ○ ○|○ ● ○ ○|○ ● ○ ○|○ ● ○ ○|○ ● ○ ○|○ ● ○ ○
INTERVAL)    ○ ○ ● ○|○ ○ ● ○|○ ○ ● ○|○ ○ ● ○|○ ○ ● ○|○ ○ ● ○
```

```
              ● ○ ○ ○|○ ○ ○ ○|● ○ ○ ○|○ ○ ○ ○|● ○ ○ ○|○ ○ ○ ○
2ND LINE
  (8 BIT     ○ ● ○ ○|○ ○ ○ ○|○ ● ○ ○|○ ○ ○ ○|○ ● ○ ○|○ ○ ○ ○
INTERVAL)    ○ ○ ● ○|○ ○ ○ ○|○ ○ ● ○|○ ○ ○ ○|○ ○ ● ○|○ ○ ○ ○
```

```
              ○ ○ ○ ●|○ ○ ○ ○|○ ○ ○ ●|○ ○ ○ ○|○ ○ ○ ●|○ ○ ○ ○
3RD LINE     ○ ○ ● ○|○ ○ ○ ○|○ ○ ● ○|○ ○ ○ ○|○ ○ ● ○|○ ○ ○ ○
  (8 BIT
INTERVAL)    ● ○ ○ ○|○ ○ ○ ○|● ○ ○ ○|○ ○ ○ ○|● ○ ○ ○|○ ○ ○ ○
              ○ ● ○ ○|○ ○ ○ ○|○ ● ○ ○|○ ○ ○ ○|○ ● ○ ○|○ ○ ○ ○
```

FIG. 16

RECORDING HEAD SYSTEM FOR INK JET RECORDING APPARATUS AND METHOD FOR DRIVING THE SAME

BACKGROUND OF THE INVENTION

1. Field of the Invention

The present invention relates to a recording head system for an ink jet recording apparatus and method for driving the same, which recording apparatus includes a so-called full-line recording head comprising ink nozzles arranged along the line across a recording medium.

2. Description of the Prior Art

An ink jet recording apparatus is a recording system which performs recording by forming ink droplets by some means, and depositing the ink droplets on a recording medium such as recording paper. Among these ink jet recording apparatuses, one which employs thermal energy to form droplets by discharging liquid has superior characteristics so that high resolution, high quality images are quickly obtained. This is because a high density multi-nozzle system can be easily implemented in this apparatus.

This type of ink jet recording apparatus comprises a recording head for a line printing, that is, a so-called full-line recording head including ink discharging portions such as ink nozzles, ink discharging ports or ink discharging orifices (henceforth they are referred to as "ink nozzles") aligned along the full line across a recording medium. This recording head comprises a plurality of liquid droplet forming means, each of which includes an electrothermal energy converting element, and a plurality of integrated circuits (driving ICs) for driving the electrothermal energy converting elements, wherein the liquid droplet forming means and the integrated circuits are formed on a single substrate. Here, the liquid droplet forming means are for discharging ink droplets from the nozzles by providing the ink with thermal energy, and the electrothermal energy converting elements heat the ink by electric current pulses supplied to the elements.

FIG. 1 shows a full-line recording head including ink nozzles arranged along the line across a recording medium.

Electrothermal energy converting elements 1, which are equally spaced, are formed together with wires, on a substrate 1 of silicon or the like through the processes similar to those employed for fabricating semiconductor devices. Separation walls 14 are formed between respective two adjacent electrothermal converting elements 1 by depositing resin layers. A flat liquid-passage-forming material 16 is joined on the separation walls 14, followed by attaching a top plate 17 of glass or the like. Thus, nozzles 12, liquid passages 13 and a common liquid chamber 15 are formed.

FIG. 2 illustrates a drive control circuit for controlling the recording head shown in FIG. 1.

A drive IC 5 is provided for each block comprising n (n=64, for example) electrothermal energy converting elements 1. Recording data SI consisting of the number of bits identical to the number of the electrothermal energy converting elements 1 are sequentially transferred to serially connected shift registers 4 in respective drive ICs 5 in synchronism with a data transfer clock (SCLK). After all the data are inputted to the shift registers 4, the data are read into latches 3 by the latch signal LAT. Subsequently, the drive ICs are sequentially enabled by D flip-flops 22 in response to the input of a time-division driving signal EI and a time-division driving signal transfer clock ECLK. Thus, only the electrothermal energy converting elements 1 associated with the ON-state record data of the enabled drive IC 5 are selectively supplied with currents during the ON interval of a current supply interval setting signal BEI, thereby discharging ink. This operation is called a block drive whose timings are illustrated in FIG. 3.

In this apparatus, recording is performed by directly discharging ink from the ink nozzles of the recording head by utilizing the pressure of the bubbles generated in the ink by supplying the electrothermal energy converting elements 1 with electric current. Accordingly, it is necessary to maintain the ink in such a state that it can be discharged without fail. The ink discharge, however, sometimes becomes unstable. The reason for this is as follows: The ink discharge, which is performed by supplying current to the electrothermal energy converting elements 1, induces changes in pressure, and the pressure changes may sometimes cause oscillation of the ink in the adjacent passages 13 through the common liquid chamber 15. As a result, when the electrothermal energy converting elements 1 placed in the adjacent passages 13 are continuously driven, the discharge becomes unstable because of the pressure changes. This leads to the changes in the volume of discharged ink, resulting in the unevenness of density of a recorded image. Such variations in the discharged volume due to the pressure changes of the ink increase consistently with the number of bits driven simultaneously, and decrease with the distance from the nozzle to the location where the pressure changes take place. Thus, the pressure changes are largely affected by the geometry of the common liquid chamber communicating to each nozzle.

In addition, since the interval between the drive timings of two adjacent blocks is constant regardless of the recording data, the bubble pressure varies when the recording frequency is high, that is, when the number of elements continuously and simultaneously driven is large. This variation in pressure transfers to the adjacent liquid passages 13 via the common liquid chamber, and causes oscillation of the ink. As a result, the discharge becomes unstable, and the volume of discharged ink varies. This presents a problem that the unevenness of density takes place in a recorded image.

Furthermore, there is another problem that the unevenness of density occurs because the variation in the discharged ink volume is greater at the center of the recording head than at the ends thereof.

For these reasons, it was necessary to enlarge the common liquid chamber so that the changes in the ink pressure have little influence on the ink discharging operation from the nozzles, or to lengthen the interval to drive the adjacent electrothermal energy converting elements. This hinders the high speed recording and the reduction in size of the recording head.

To overcome such a problem, it might be possible to drive all the electrothermal energy converting elements simultaneously. The current flowing through a single electrothermal energy converting element 1, however, is rather large ranging from several tens to hundreds of milliamperes. Consequently, the total sum of the current required for driving all the elements grows very large, which is unacceptable from the viewpoint on shrinking the power supply and recording head. This is the reason why the block drive has been employed in which the electrothermal energy converting elements are divided into a plurality of blocks, and the blocks are driven in time sharing fashion.

SUMMARY OF THE INVENTION

It is therefore an object of the present invention to provide a recording head system for an ink jet recording apparatus and method for driving the same, which can reduce the unevenness of density of a recorded image, which unevenness is caused by the periodic changes in the ink pressure.

In a first aspect of the present invention, there is provided a recording head system for an ink jet recording apparatus which performs recording in accordance with recording data, the system comprising:

a recording head including a plurality of discharging portions for discharging ink, a plurality of ink passages each of which communicates to each one of the discharging portions, a common ink chamber for storing ink supplied to the ink passages, and a plurality of ejecting means each of which is disposed in each one of the ink passages for discharging ink droplets from the discharging portions in response to the recording data, the ejecting means being divided into one or more blocks; and control means for controlling discharge timings of the ejecting means by changing enable timings of the ejecting means.

Here, the control means may comprise comparing means for comparing a recording ratio of each block with a predetermined reference recording ratio, and means for controlling the enable timing of each of the blocks in accordance with a comparing result by the comparing means, wherein the recording ratio of the block is defined as the ratio of the number of the ejecting means to be driven in the block in accordance with the recording data to the total number of the ejecting means in the block.

The control means may control the drive timings so that the interval between the drive timing of a block and that of the next block increases consistently with the recording ratio.

The recording head may be a full-line recording head, and the control means may control the enable timings of the blocks in such a manner that an interval between the enable timing of a block and that of the next block is made longer as the position of the blocks moves towards the center of the recording head.

The recording head may be a full-line recording head, and the controlling means may comprise detecting means for detecting the position of ON bits of the recording data in a line to be recorded, and driving signal generating means for controlling the enable timing in response to the detected result of the detecting means.

The control means may skip driving of a block including no ON bits of the recording data.

The recording head may be a full-line head, and the control means may comprise time-division driving means for driving the recording head on the time-division basis in such a manner that the number and position of ejecting means which are simultaneously enabled are changed line by line.

The time-division driving means may comprise selecting means for selecting enabling bits which are used to enable the ejecting means associated with the enabling bits.

The selecting means may comprise a shift register for storing selecting data which designates one bit per block as the enabling bit, the selecting means shifting the selecting data bit by bit so that the each one of the ejecting means of each block is sequentially enabled by the selecting data.

The selecting data and the size of the block may be changed line by line.

The selecting means may comprise a plurality of selecting data inherent in various types of recording heads.

The selecting means may comprise a random data generating circuit for generating initial selecting data which selects the enable bits at the start of recording of each line, the selecting means selecting remaining bits in the line in a sequential manner so that the time-division drive is performed changing from line to line the number and position of bits to be driven at the same time.

The selecting means may further comprise holding means for holding the selecting data.

The ejecting means may be an electrothermal energy converting element which converts electric current into thermal energy to form bubbles in ink.

The discharging portions may be nozzles.

The system may be applied to a copy machine including a reader.

The system may be applied to a facsimile including a transmitting and receiving function.

In a second aspect of the present invention, there is provided a head drive method for an ink jet recording apparatus which performs recording in accordance with recording data by using a recording head including a plurality of discharging portions for discharging ink, a plurality of ink passages each of which communicates to each one of the discharging portions, a common ink chamber for storing ink supplied to the ink passages, and a plurality of ejecting means each of which is disposed in each one of the ink passages for discharging ink droplets from the discharging portions in response to the recording data, the ejecting means being divided into one or more blocks, the method comprising the steps of:

driving a first block;

comparing a recording ratio of the first block with a predetermined reference recording ratio, the recording ratio of the block being defined as the ratio of the number of the ejecting means to be driven in the block in accordance with the recording data to the total number of the ejecting means in the block;

determining an interval between the drive timing of the first block and that of a second block in accordance with a comparing result;

driving the second block after the interval has elapsed from drive timing of the first block; and repeating the comparing step, determining step and driving step for the remaining blocks.

Here, the recording head may be a full-line recording head, and the interval between the drive timing of the first block and that of the second may be made longer as the positions of the blocks move towards the center of the recording head.

A head drive method may further comprise the steps of detecting the positions of ON bits of the recording data in a line to be recorded, and controlling the drive timing in response to the detected result.

The driving of a block including no ON bits of the recording data may be skipped.

In a third aspect of the present invention, there is provided a head drive method for an ink jet recording apparatus which performs recording in accordance with recording data by using a full-line recording head including a plurality of discharging portions for discharging ink, a plurality of ink passages each of which communicates to each one of the discharging portions, a common ink chamber for storing ink supplied to the ink passages, and a plurality of ejecting means each of which is disposed in each one of the ink passages for discharging ink droplets from the discharging portions in response to the recording data, the ejecting means being divided into one or more blocks, the method comprising the steps of:

loading a first selecting data which determines the number and position of the ejecting means which are simultaneously driven;

driving a line on the time-division basis by shifting the first selecting data sequentially so as to cover the entire ejecting means of that line;

loading a second selecting data which is different from the first selecting data, and determines the number and position of the ejecting means which are simultaneously driven; and driving a next line on the time-division basis by shifting the second selecting data sequentially so as to cover the entire ejecting means of that line.

Here, the selecting data and the size of the block may be changed line by line.

The selecting data may comprise a plurality of data inherent in various types of recording heads.

The selecting data may be generated at random at the start of recording of each line, and remaining bits in the line may be selected in a sequential manner so that the time-division drive is performed changing from line to line the number and position of bits to be driven at the same time.

The loading and shifting of the selecting data may be carried out in parallel.

The ejecting means may be an electrothermal energy converting element which converts electric current into thermal energy to form bubbles in ink.

The discharging portions may be nozzles.

The method may be applied to a copy machine including a reader.

The method may be applied to a facsimile including a transmitting and receiving function.

In a fourth aspect of the present invention, there is provided an ink jet recording apparatus comprising:

means for forming image data in accordance with recording data;

a full-line recording head including a plurality of discharging portions for discharging ink, a plurality of ink passages each of which communicates to each one of the discharging portions, a common ink chamber for storing ink supplied to the ink passages, and a plurality of ejecting means each of which is disposed in each one of the ink passages for discharging ink droplets from the discharging portions in response to the recording data;

time-division driving means for driving the recording head on the time-division basis in such a manner that the number and position of ejecting means which are simultaneously enabled are changed line by line; and control means for controlling driving of the ejecting means.

Here, the discharging portions may be nozzles.

The apparatus may be applied to a copy machine including a reader.

The apparatus may be applied to a facsimile including a transmitting and receiving function.

According to the present invention, the oscillation of ink due to pressure waves induced by ink discharge can be scattered. As a result, the effect of ink pressure changes on printing can be reduced.

The above and other objects, effects, features and advantages of the present invention will become more apparent from the following description of the embodiments thereof taken in conjunction with the accompanying drawings.

BRIEF DESCRIPTION OF THE DRAWINGS

FIG. 16 is a schematic diagram illustrating an example of random bit selecting data;

DETAILED DESCRIPTION OF PREFERRED EMBODIMENTS

The invention will now be described with reference to the accompanying drawings.

Embodiment 1

Figure 4:
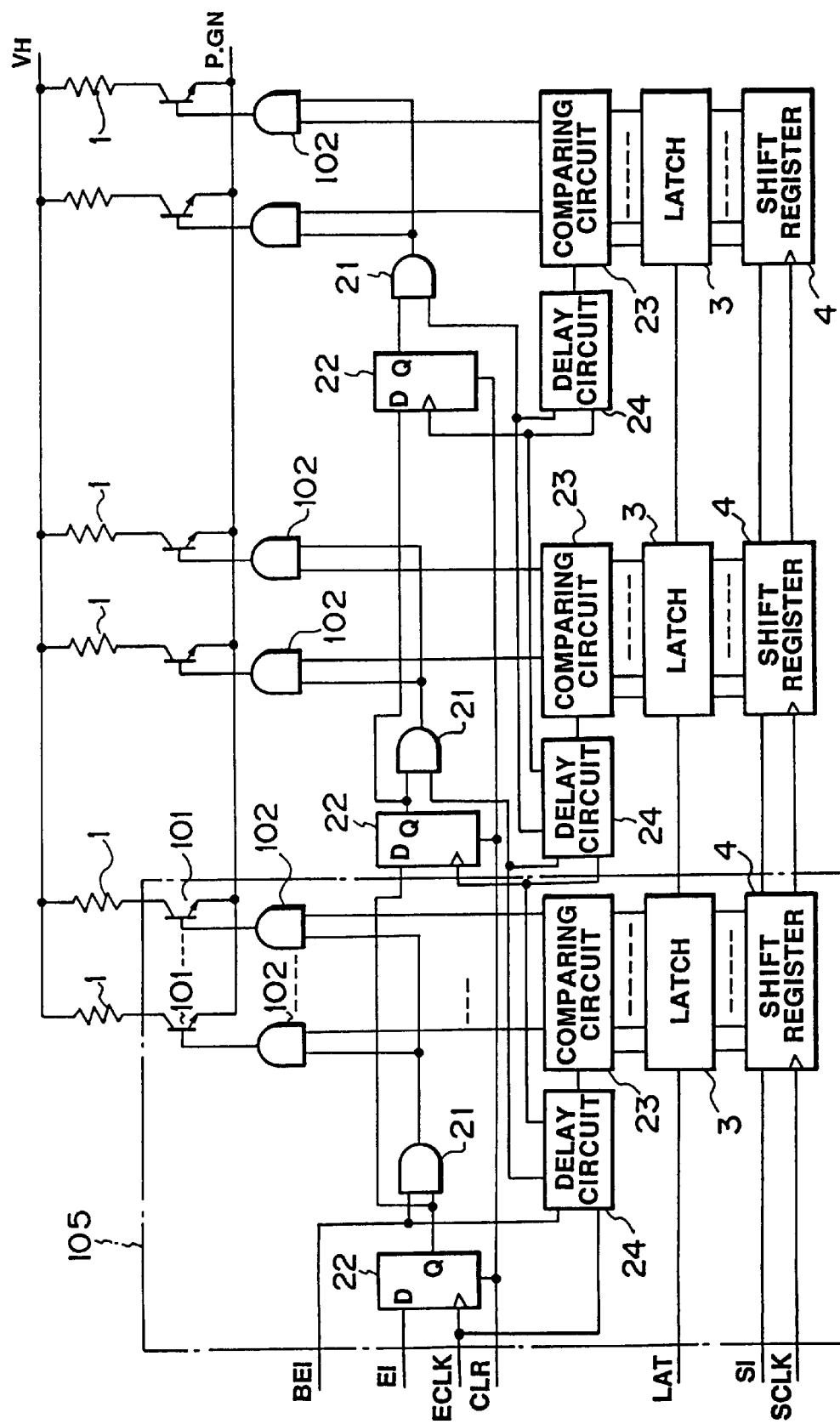
FIG. 4 is a block diagram showing the arrangement of a first embodiment according to the present invention.

FIG. 4 shows a first embodiment of the present invention.

Figure 1:
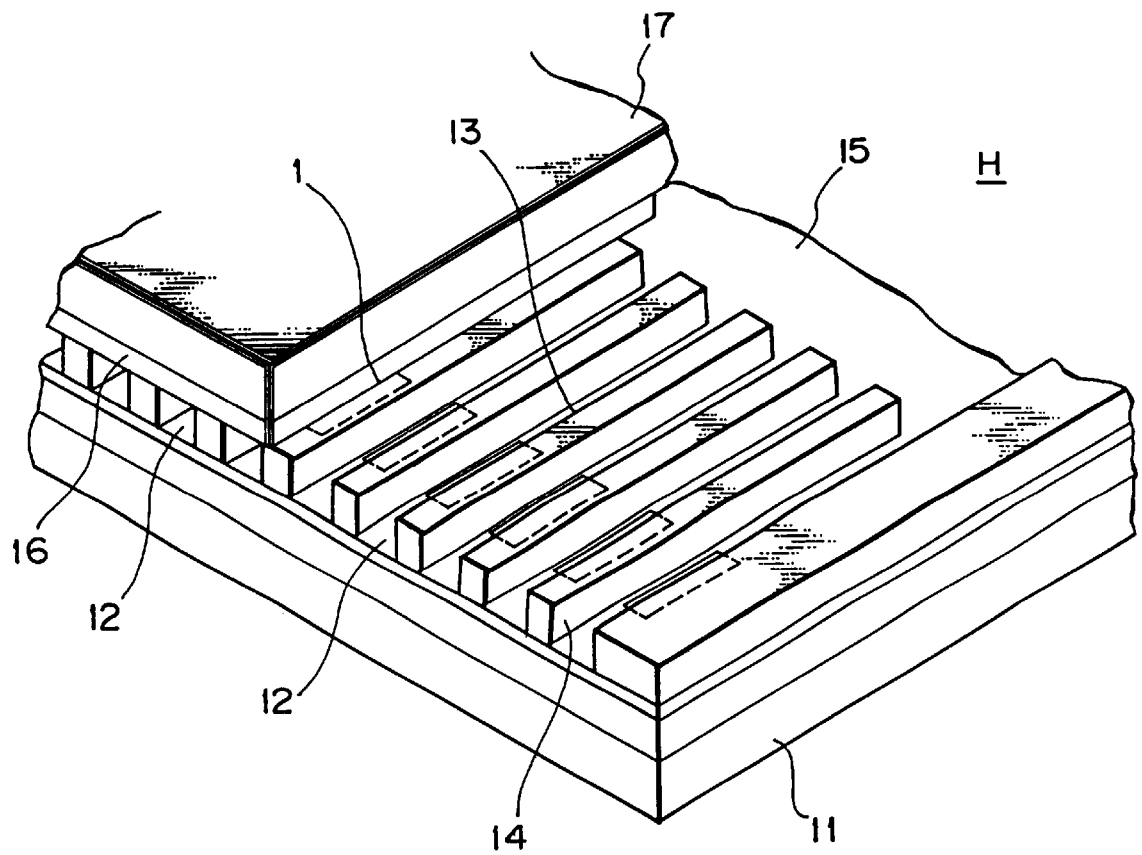
FIG. 1 is a perspective view showing an example of the structure of a full-line recording head.
Figure 2:
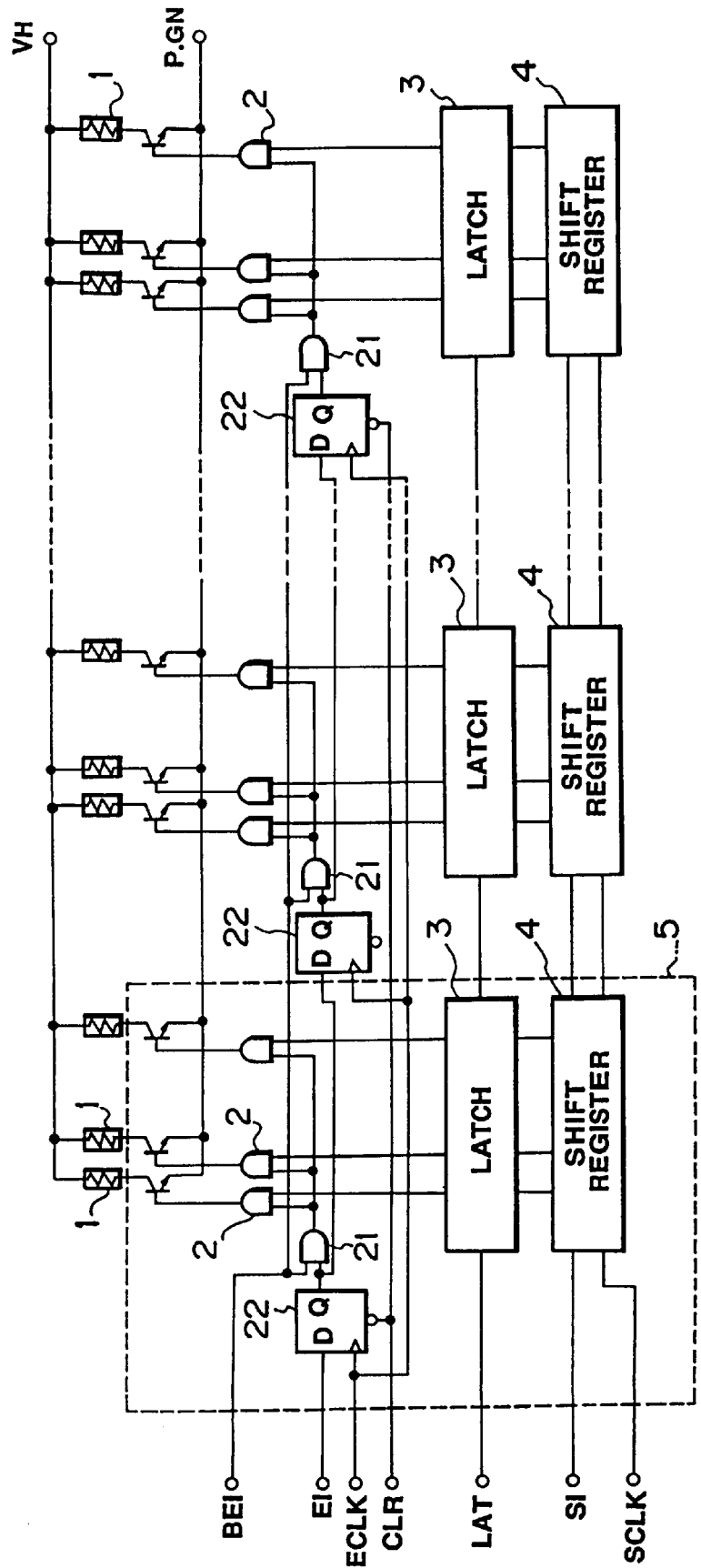
FIG. 2 is a block diagram showing a drive control circuit for controlling the driving of the recording head shown in FIG. 1.
Figure 3:
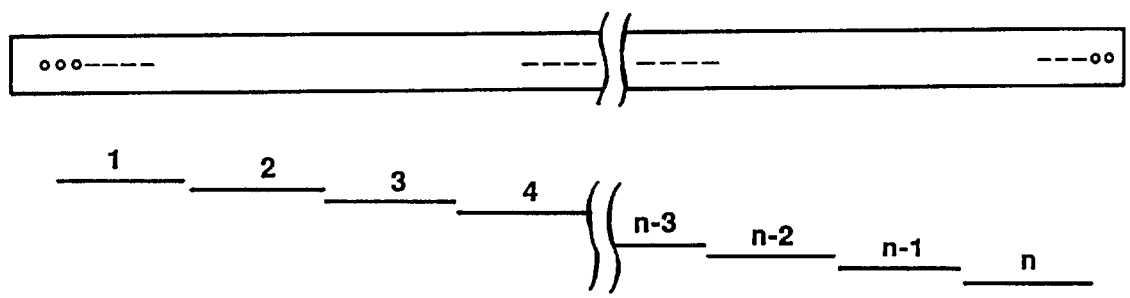
FIG. 3 is a diagram illustrating the drive timing of blocks by the drive control circuit shown in FIG. 2.

In FIG. 4, reference numerals 1, 3, 4, 21 and 22 designate the corresponding portions in FIG. 2. Comparing circuits 23 compare the number of bits of the data to be printed which are latched in the latch 3 with the number of average bits of the data to be printed. Delay circuits 24 delay the current supply interval setting signal BEI and the current supply start control clock ECLK in accordance with the results of comparison by the comparing circuits 23, that is, in accordance with the printing ratios. Each AND gate 102 associated with a bit to be printed out of the 64 bits in each block produces the high level when the output of the corresponding AND gate 21 is at the high level.

When the number of bits to be printed is greater than the number of average bits to be printed, that is, in the case where the printing ratio is high, the pressure change in the ink will be great. Accordingly, the delay times given to the current supply start control clock ECLK and the current supply interval setting signal BEI are set longer than the normal delay times so that the interval T2 between the drive timing of a block and that of the next block is lengthened as shown in FIG. 5B compared with the normal interval T1 as shown in FIG. 5A.

On the other hand, when the number of bits to be printed is less than the number of average bits to be printed, that is, in the case where the printing ratio is low, the pressure change in the ink is small. Accordingly, the delay times given to the current supply start control clock ECLK and the current supply interval setting signal BEI are set shorter than the normal delay times so that the interval T3 between the drive timing of a block and that of the next block is shortened as shown in FIG. 5C compared with the normal interval T1 as shown in FIG. 5A.

For instance, when the number of bits in each block is 64 bits, an average number of bits to be driven simultaneously in the block is generally about 16 bits because the print density is usually falls in the range from 20% to 30%. Accordingly, the time interval may be determined as follows depending on the number of bits to be printed simultaneously: when the number of bits to be simultaneously printed is equal to or greater than 32 bits, the interval is lengthened as illustrated in FIG. 5B; whereas when it equal to or less than 8 bits, the interval is shortened as illustrated in FIG. 5C.

Figure 5A:
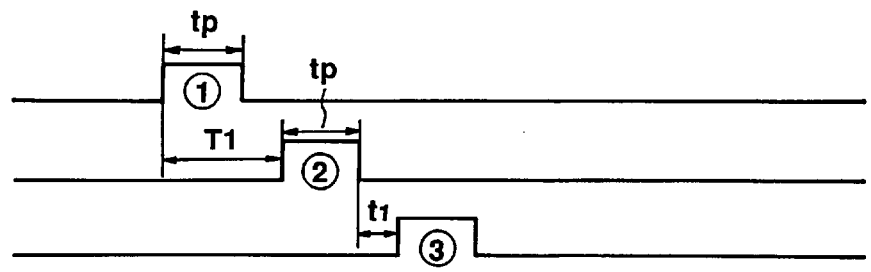
FIGS. 5A–5C are timing charts illustrating drive timings in the first embodiment.
Figure 5B:
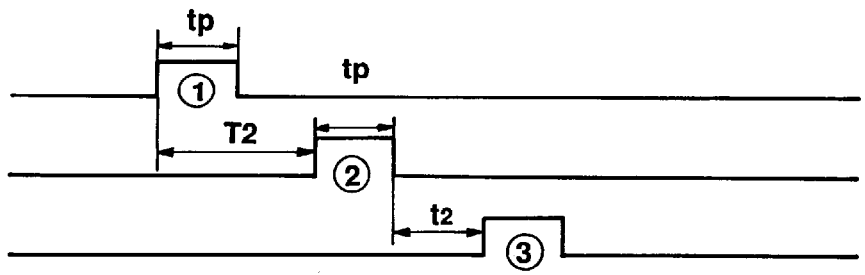
Figure 5C:
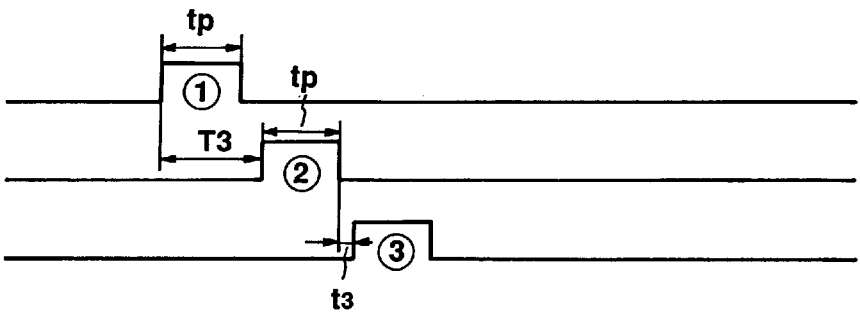

In FIGS. 5A–5C, typical values are set as follows: the pulse width tp ranges from 2 to 10 $\mu s$; t1 is set at about 5 $\mu s$; t2, about 10 $\mu s$; and t3, about 2 $\mu s$.

Embodiment 2

Figure 6:
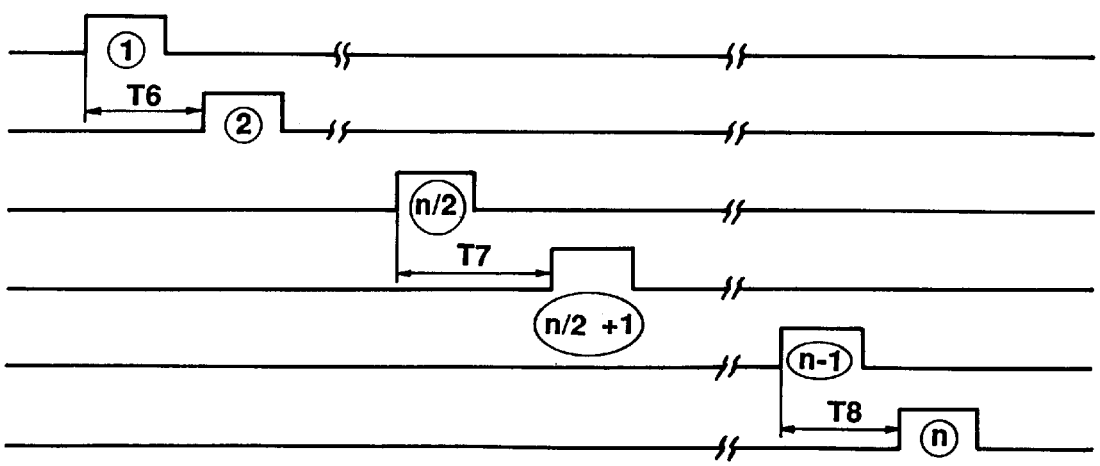
FIG. 6 is a timing chart illustrating drive timings in a second embodiment.

In this embodiment, the interval T between the drive timing of a block and that of the next block is gradually lengthened as the position of the block proceeds from the ends to the center of the recording head as shown in FIG. 6. For example, the intervals T6 and T8 at the ends of the recording head are made shorter than the interval T7 at its center. In accordance with the conventional driving method, the changes in the ink pressure increase as the position of the block moves towards the center of the recording head. In view of this, it is clear that this embodiment can make the ink pressure more uniform, and this will reduce the unevenness of density of a recorded image.

The unevenness of density of the recorded image can be further reduced by combining the methods of the first and second embodiments: by combining the method of the first embodiment in which the unevenness is reduced by controlling the printing interval in accordance with the printing ratios, and the method of the second embodiment in which the printing interval is controlled in accordance with the position of printing.

Figure 7:
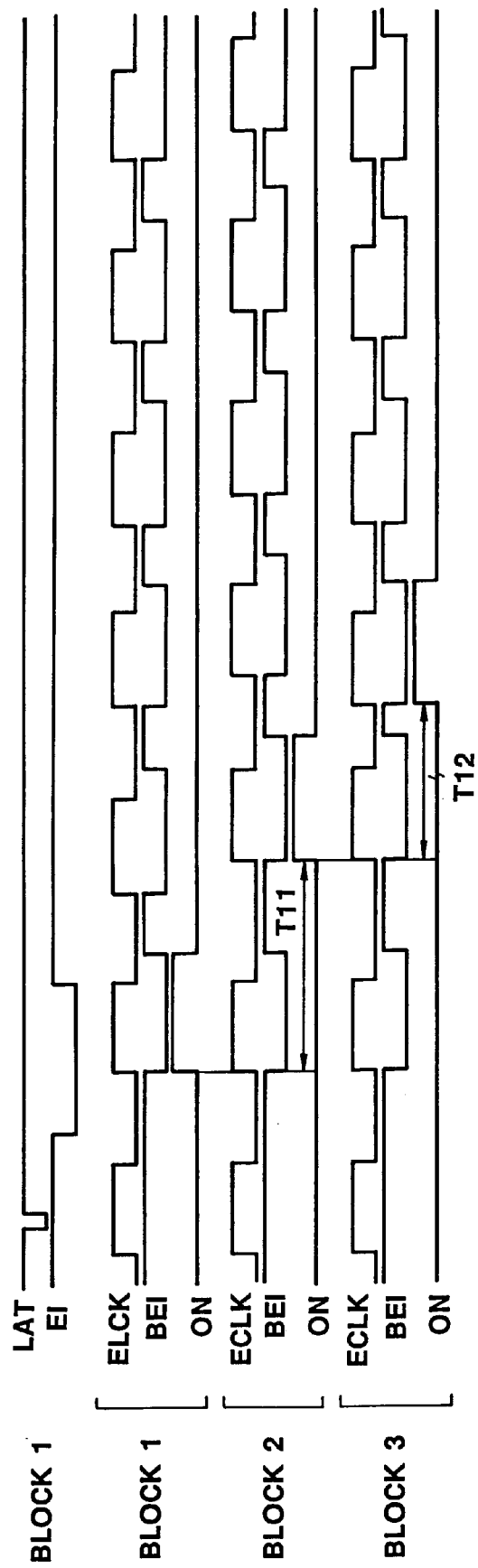
FIG. 7 is a timing chart illustrating drive timings when block 1 includes more print data than block 2.

FIG. 7 is a timing chart illustrating the printing operation when the amount of the print data of block 1 is greater than that of the block 2. As shown in this figure, the interval T11 between the drive timing of the block 1 and that of the block 2 is made longer than the interval T12 between the drive timing of the block 2 and that of the block 3.

As described above, this embodiment of the head drive system for an ink jet recording apparatus incorporates the drive IC controlling the interval between the drive timings of adjacent blocks. This makes it possible to improve printing quality without reducing the printing speed.

Embodiment 3

Figure 8:
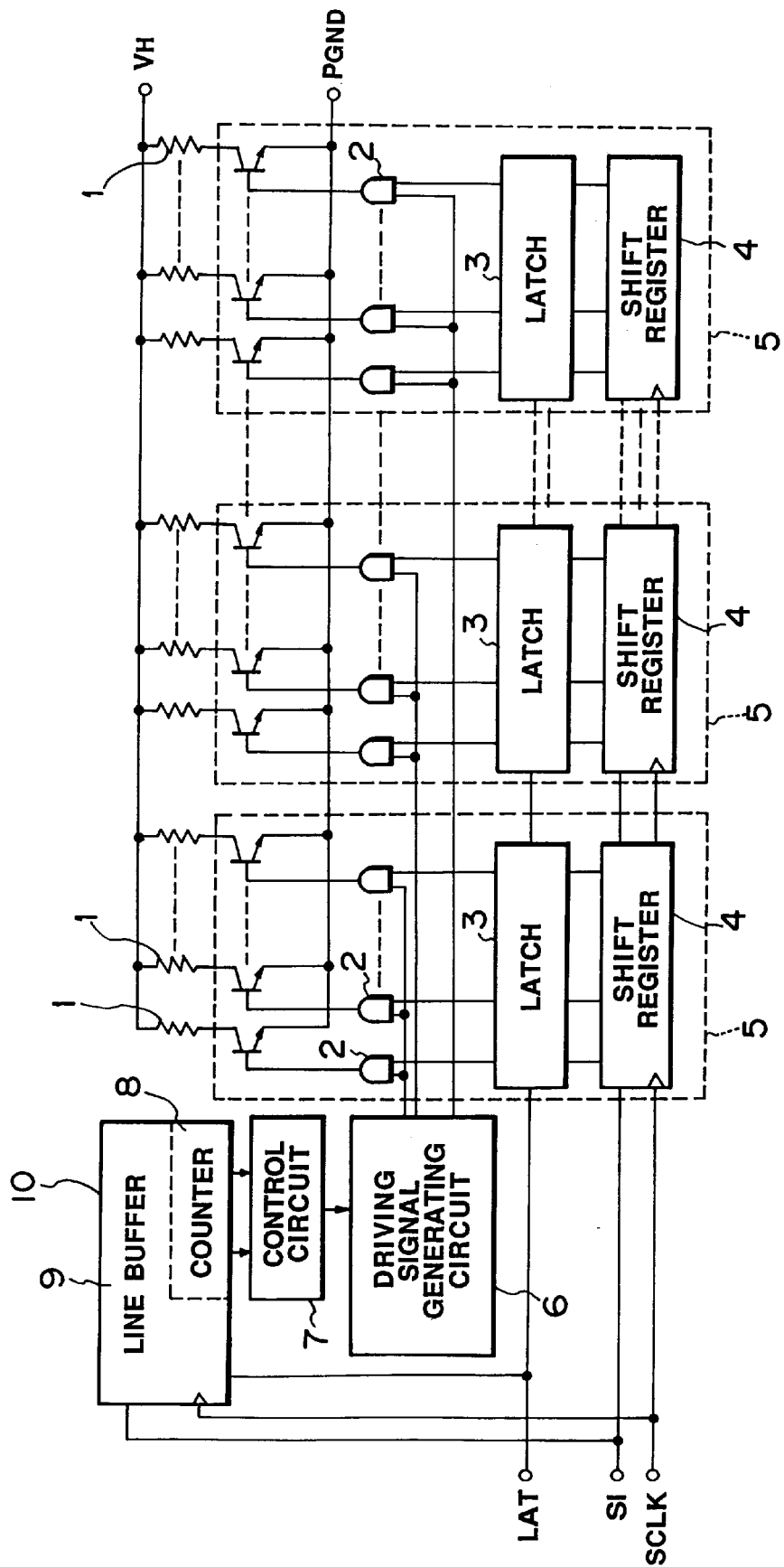
FIG. 8 is a block diagram showing the arrangement of a third embodiment of the present invention.

FIG. 8 shows a third embodiment in accordance with the present invention.

This embodiment differs from the first embodiment in that it comprises, in addition to the first embodiment in FIG. 4, a line buffer 9 for storing print data for one line, a counter 8, a control circuit 7 determining the drive timing based on the output of the counter 8, and a driving signal generating circuit 6 for generating a driving signal. The line buffer 9 and the counter 8 constitute a print information searching portion 10. In this embodiment, the print data is detected line by line so that the optimum drive timing for printing is determined.

The recording data SI and the data transfer clock SCLK are supplied to the line buffer 9 and the counter 8 as well as to the shift register 4. The counter 8 counts the position number of data to be printed contained in one-line recording data, thus searching the print information. The outputs from the print information searching portion 10 are fed to the control circuit 7. The control circuit 7 provides the driving signal generating circuit 6 with optimum drive timings in accordance with that print information. When the driving condition for the one-line data is determined, the latch signal LAT starts printing. At the same time, the line buffer 9 and the counter 8 are cleared so as to accept the print data of the next line.

Figure 9:
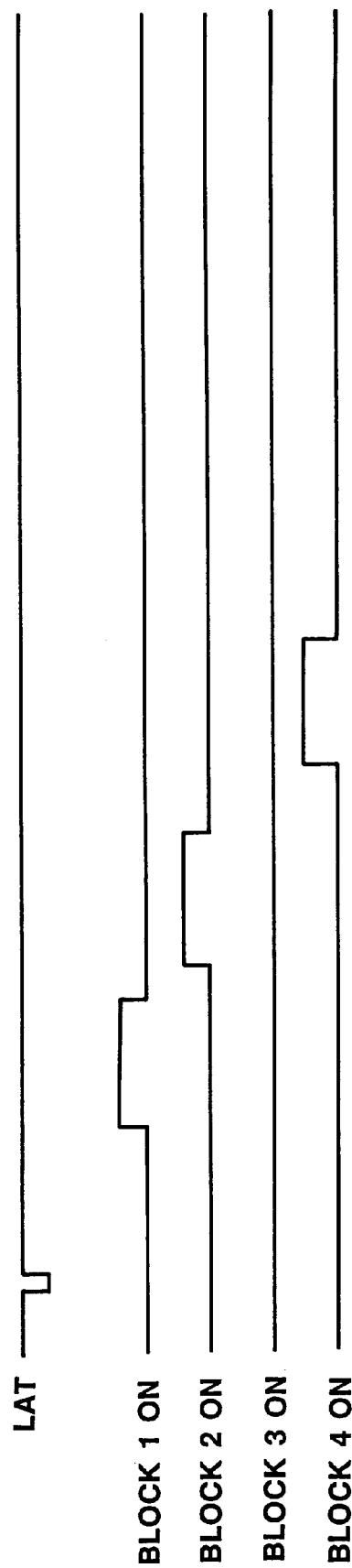
FIG. 9 is a timing chart illustrating drive timings when a block including no print data is present.

FIG. 9 illustrates the printing operation of the third embodiment. When there is a block including no print data (block 3 in this case), this block is skipped and the printing of the next block is immediately started so that the printing time is shortened. Since the driving signal is not generated for the unnecessary block, a faster printing operation is performed.

Embodiment 4

Figure 10:
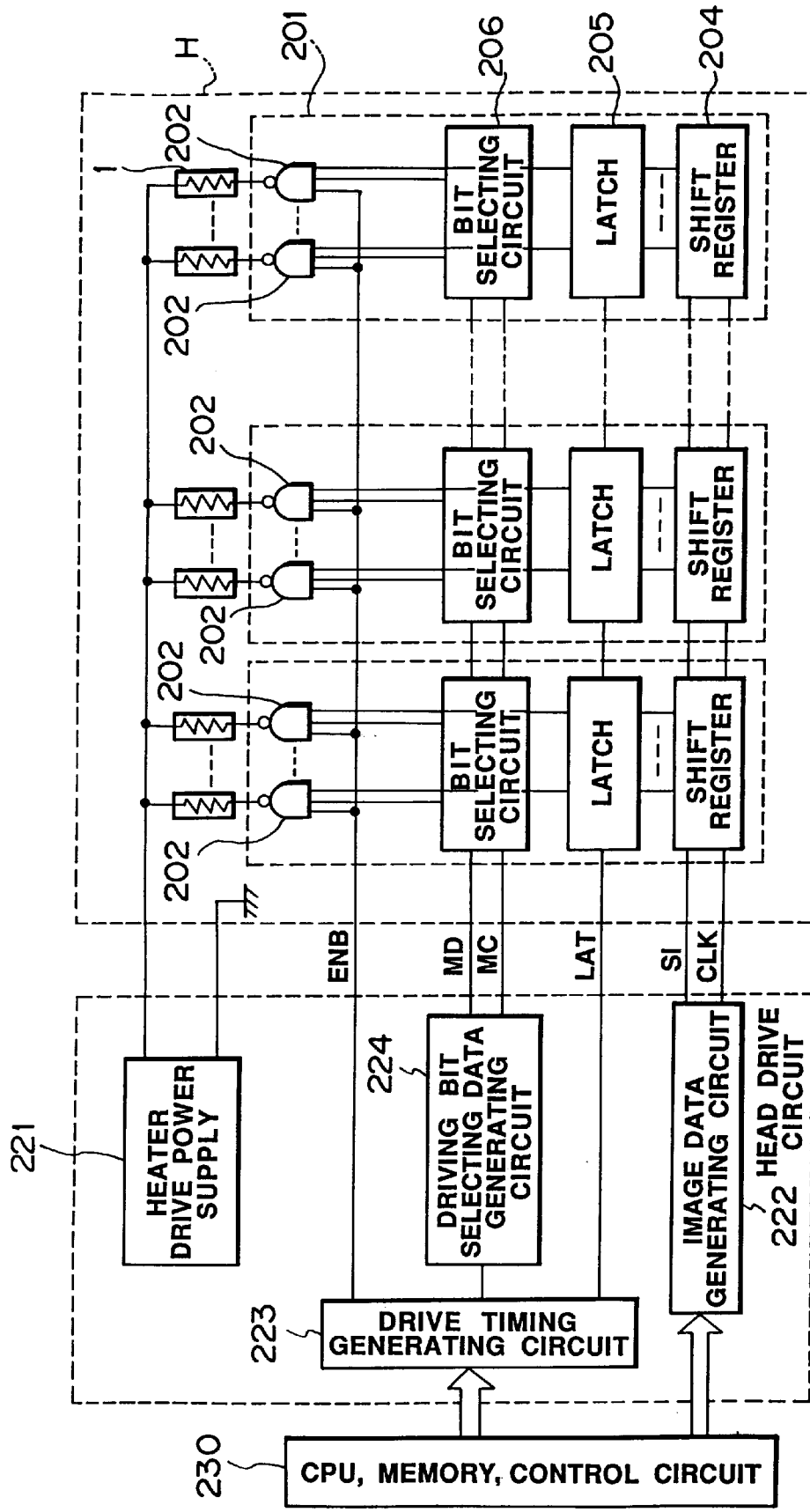
FIG. 10 is a block diagram showing the arrangement of a fourth embodiment of the present invention.

FIG. 10 shows a fourth embodiment in accordance with the present invention.

In FIG. 10, reference numeral 1 designates the electrothermal energy converting elements as in FIG. 4. Reference numeral 220 denotes a head drive circuit comprising a heater drive power supply 221, a drive timing generating circuit 223, a driving bit selecting data generating circuit 224 and an image data generating circuit 222.

The heater drive power supply 221 supplies power to the electrothermal energy converting elements 1. The image data generating circuit 222 generates image data from the recording data supplied from a CPU 230. The drive timing generating circuit 223 generates an enable signal ENB, a latch signal LAT. The driving bit selecting data generating circuit 224 generates a time-division driving bit selecting data MD.

Reference numeral 201 designates drive circuits of the electrothermal converting elements 1, each of which comprises a shift register 204, a latch 205, a bit selecting circuit 206, and NAND gates 202.

The shift registers 204 accept the image data SI, consisting of the same number of bits as the number of the electrothermal energy converting elements 1, from the image data generating circuit 222 in synchronism with the clock signal CLK. The latches 205 latch the image data SI stored in the shift registers 204 in response to the latch signal LAT. The bit selecting circuits 206 have accepted the time-division driving bit selecting data MD from the driving bit selecting data generating circuit 224. The NAND gates 202 NAND the image data from the latches 205, the time-division driving bit selecting data MD from the bit selecting circuits 206, and the enable signal ENB from the drive timing generating circuit 223.

The CPU 230 comprises a memory circuit, a control circuit or the like to control the head drive circuit 220.

Next, the operation of the embodiment will be described with reference to FIG. 11.

An n-th line image data SI is entered into the shift register 204 from the image data generating circuit 222 in synchronism with the clock signal CLK. Subsequently, the image data is latched into the latches 205 in response to the latch signal LAT from the drive timing generating circuit 223.

Meanwhile, the time-division driving bit selecting data MD for the n-th line is entered into the bit selecting circuits 206 from the driving bit selecting data generating circuit 224 in response to the clock signal MC, and then the enable signal ENB is inputted to the NAND gates 202.

Figure 12:
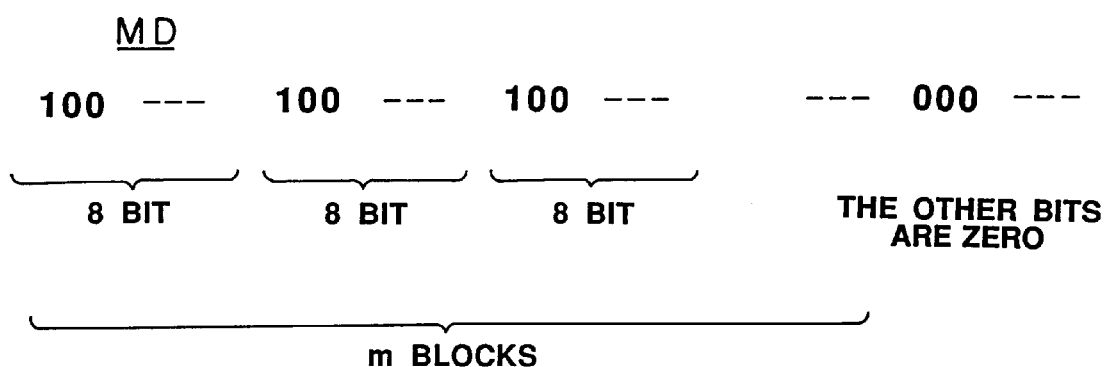
FIG. 12 is a schematic diagram illustrating an example of bit selecting data associated with an n-th line.

As illustrated in FIG. 12, one line is divided into a plurality of block groups, each of which consists of m blocks, and each block consists of 8 bits. The recording head is separately driven on the block group basis, and one of the eight bits of each block in the block group are sequentially enabled by using the time-division driving bit selecting data MD as shown in FIG. 12 so that maximum m bits are enabled at the same time. In other words, the enabling bits are spaced at 8-bit intervals in the block group, and are shifted eight times to complete the printing of one block group. The electrothermal energy converting elements 1 to be driven are selected from the elements associated with the enabled m-bits by the time-division driving bit selecting data MD, and only the selected elements 1 are driven.

Figure 11:
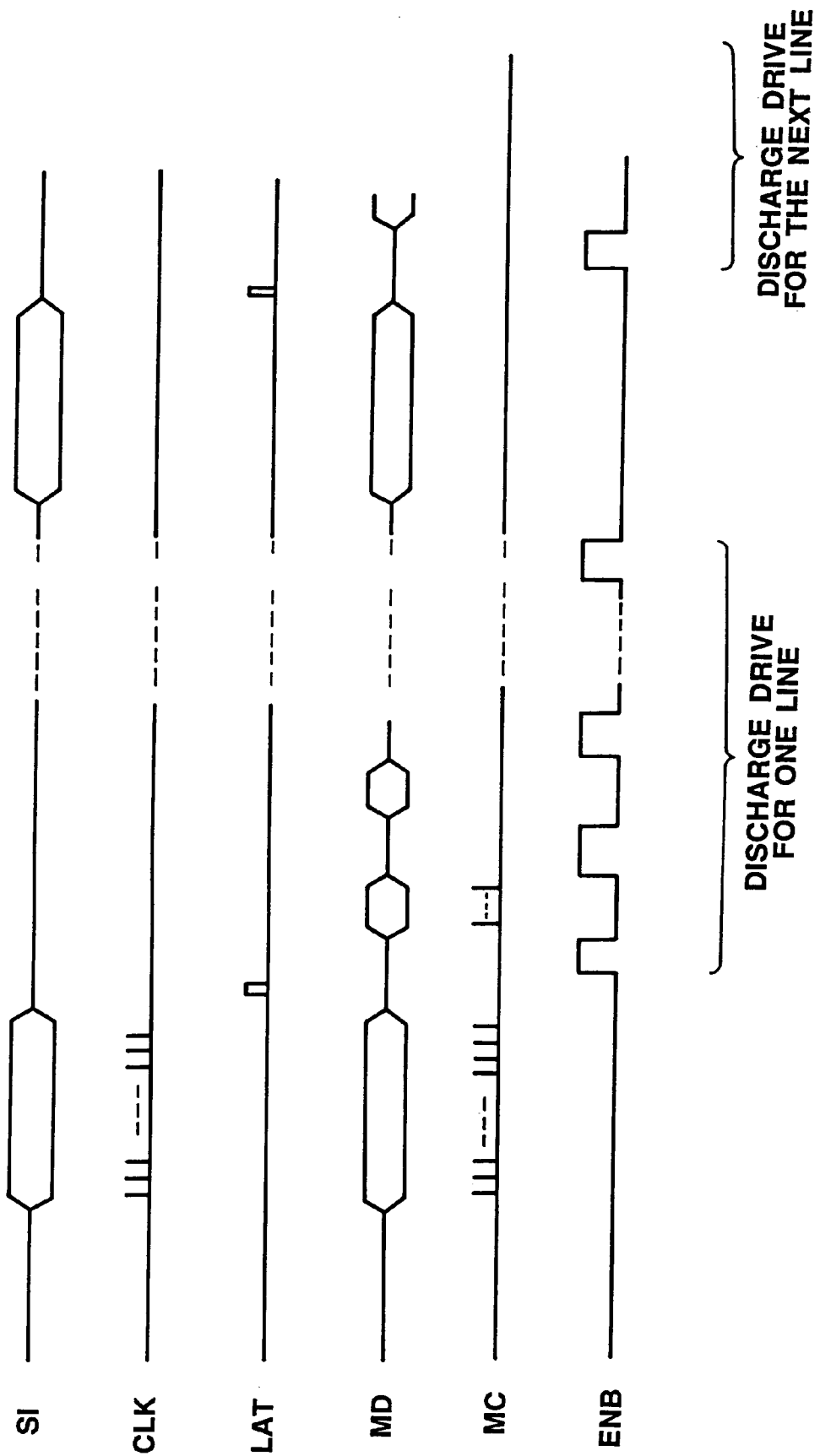
FIG. 11 is a timing chart illustrating drive timings in the fourth embodiment.

After completing the drive of one block group, the time-division driving bit selecting data MD is shifted by 8×m bits so that the next block group is driven in the same manner as the preceding block group as shown in FIG. 11.

Figure 13:
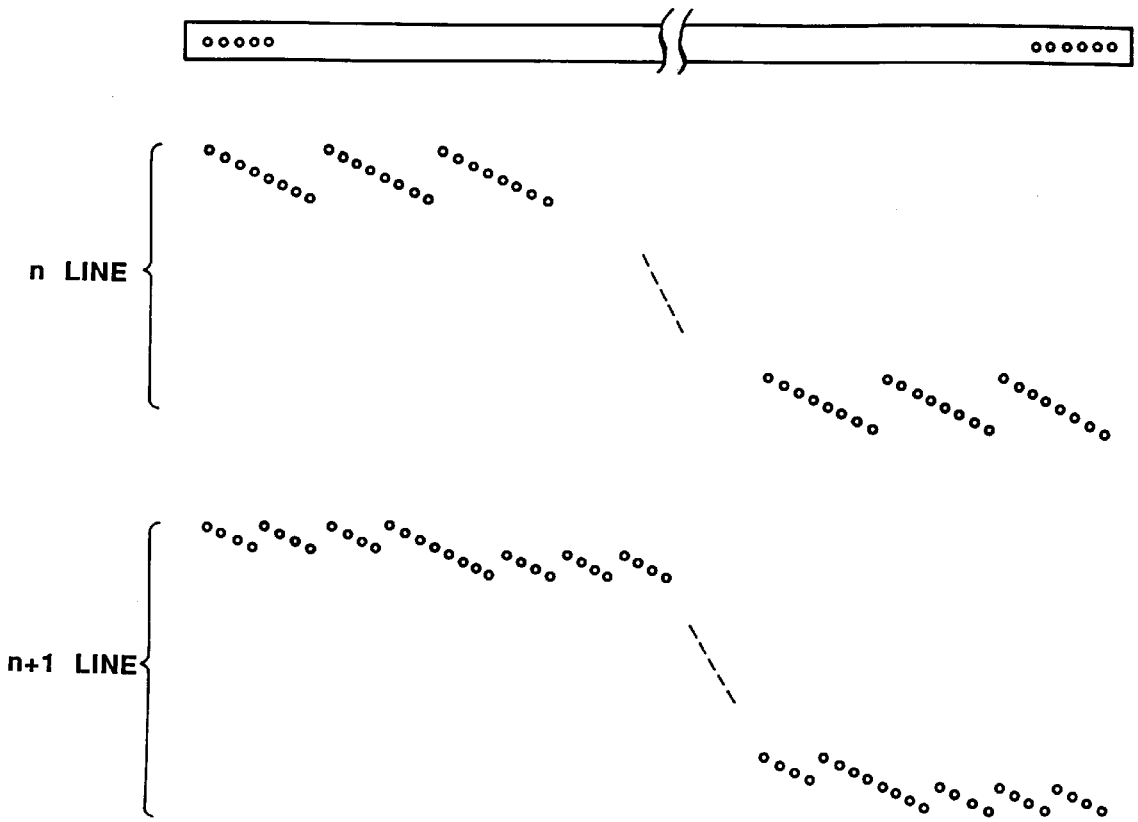
FIG. 13 is a schematic diagram illustrating a driving example to n-th and n+1-th lines.

After that, similar driving cycle is repeated until all the block groups of one line have been completed. The upper half of FIG. 13 illustrates the driving example for the n-th line.

Figure 14:
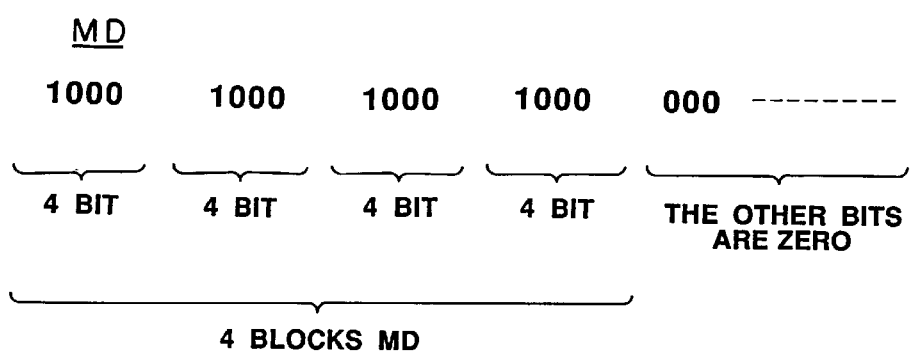
FIG. 14 is a schematic diagram illustrating an example of bit selecting data associated with n+1-th line of FIG. 13.

When the n-th line printing has been completed, the n+1-th line printing is started. Comparing the recording methods of the n-th and n+1-th lines, it is found that the number of blocks forming a block group and the number of bits forming a block of nth line are different from those of the n+1-th line. More specifically, although the number of blocks forming a block group and the number of bits forming a block are determined as m blocks and 8 bits in the n-th line, they are determined as k blocks and 4 bits in the n+1-th line. Accordingly, the maximum number of bits simultaneously driven in the n+1-th line is k, and thus, the enabling bits are spaced at 4-bit intervals. FIG. 14 illustrates the bit selecting data MD in the case where the one block group consists of four blocks and one block consists of four bits. The driving example of the n+1-th line is illustrated in FIG. 13.

In this embodiment, since the number and position of bits simultaneously enabled differ from line to line, the ink pressure induced by the ink ejection is scattered so that the changes in the volume of ink discharge can be reduced.

The ink pressure changes associated with the ink discharge depend on the size of the common liquid chamber, ink discharge volume or the like. Consequently, the number and position of bits simultaneously enabled for achieving a stable discharge may change depending on the type of a recording head.

Further, the number and position of bits simultaneously enabled can be altered for each line by changing the time-division drive bit selecting data on the basis of the discharge driving pattern inherent in the ink jet recording head. In general, the fluctuation of the ink pressure at the ink discharge depends on the dimension of the common ink chamber, ink discharge volume or the like so that the number and position of bits simultaneously enabled for stable discharge differ depending on the type of recording heads. Accordingly, it is preferable that the time-division drive bit selecting data be changed line by line based on the pattern inherent in the recording head.

Figure 15:
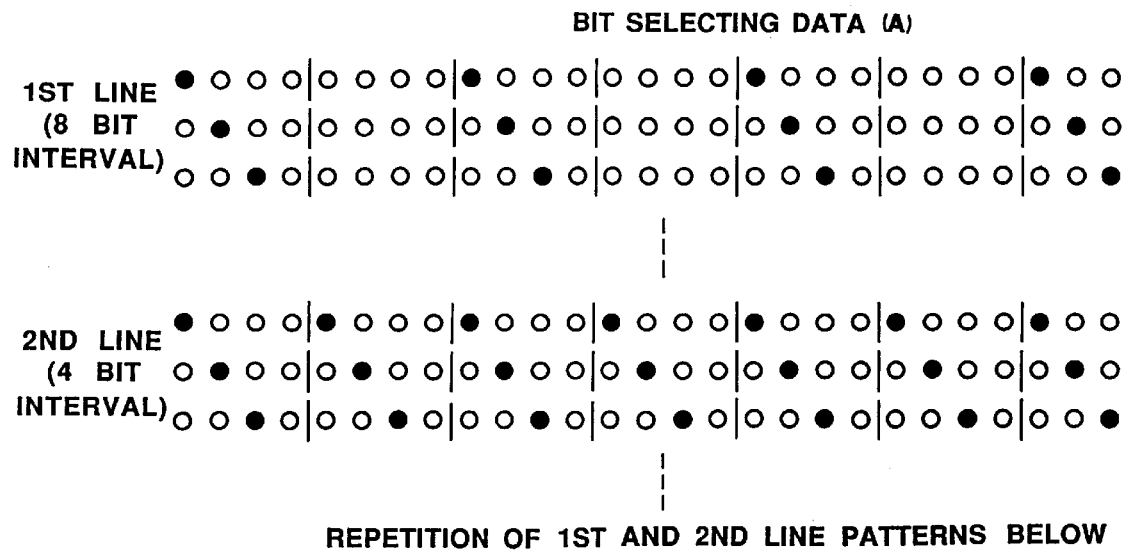
FIGS. 15A and 15B are schematic diagrams illustrating examples of bit selecting data.
Figure 15:
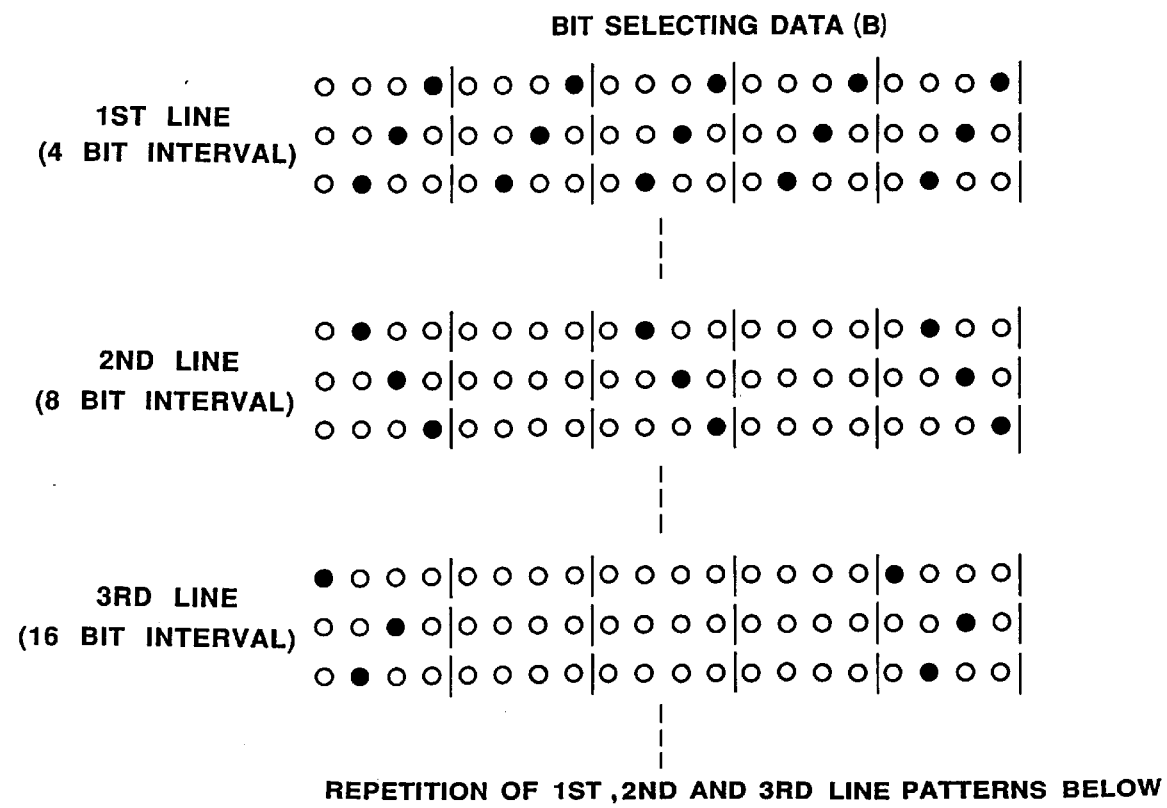

FIGS. 15A and 15B illustrate examples of the time-division drive bit selecting data which are preferably employed for two different types of heads. As shown in these figures, the number and position of bits simultaneously enabled can be altered for each line.

When the same bit selecting data is repeatedly used, periodic unevenness of intensity may result because of the stationary wave of ink pressure caused by the ink discharge. To avoid this, the number and position of bits simultaneously enabled can be changed at random as shown in FIG. 16. This is achieved by generating initial time-division drive bit selecting data of a line by using a random data generating circuit, and then, by selecting the remaining bits in the line in a sequential manner so that the time-division drive is performed with changing from line to line the number and position of bits to be driven at the same time. This method is particularly effective to prevent periodic unevenness of density due to stationary waves of the ink pressure.

Embodiment 5

Figure 17:
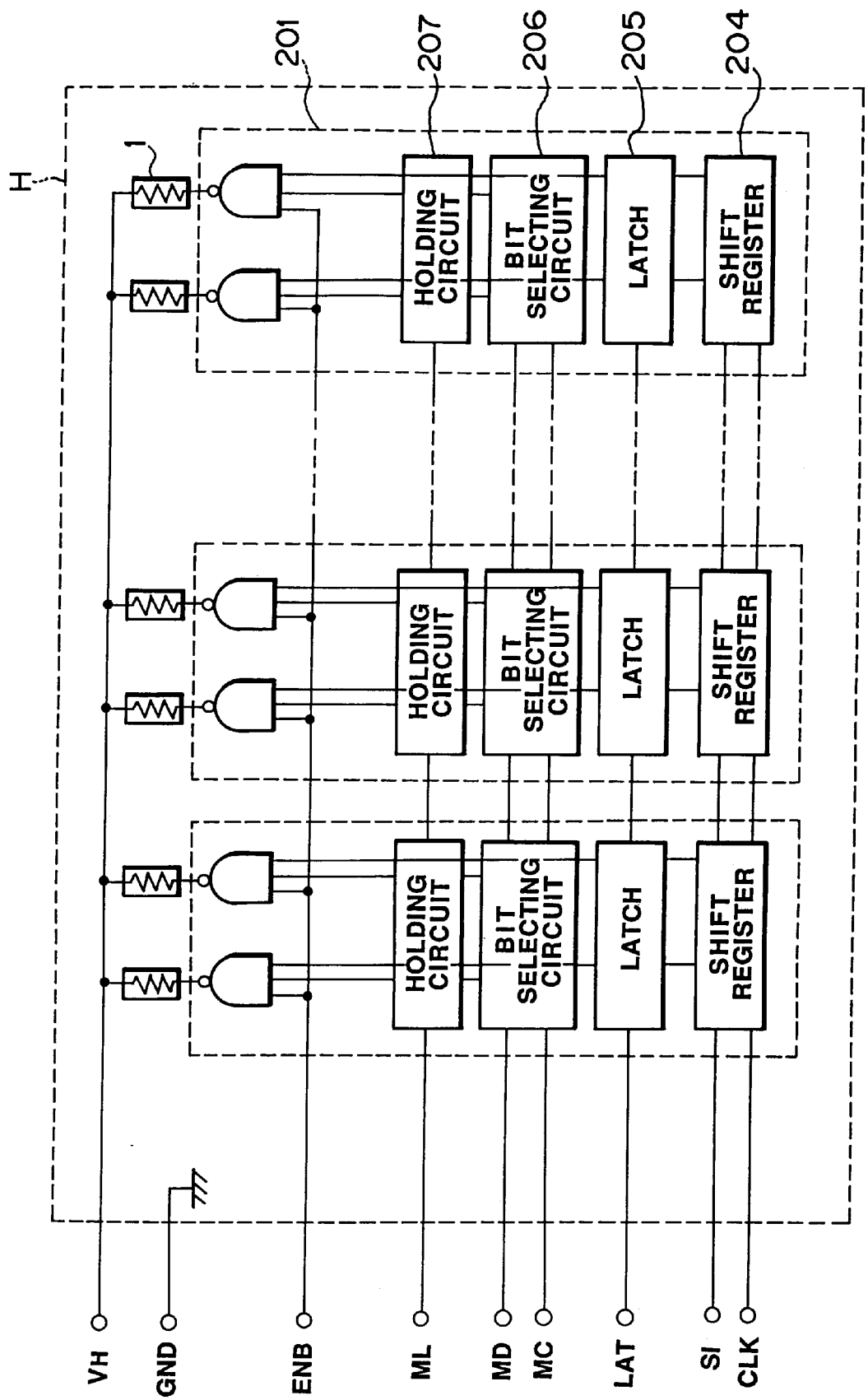
FIG. 17 is a block diagram showing the arrangement of a fifth embodiment of the present invention.

FIG. 17 shows a fifth embodiment in accordance with the present invention.

This embodiment differs from the fourth embodiment in the timings for driving the electrothermal energy converting elements 1.

Figure 18:
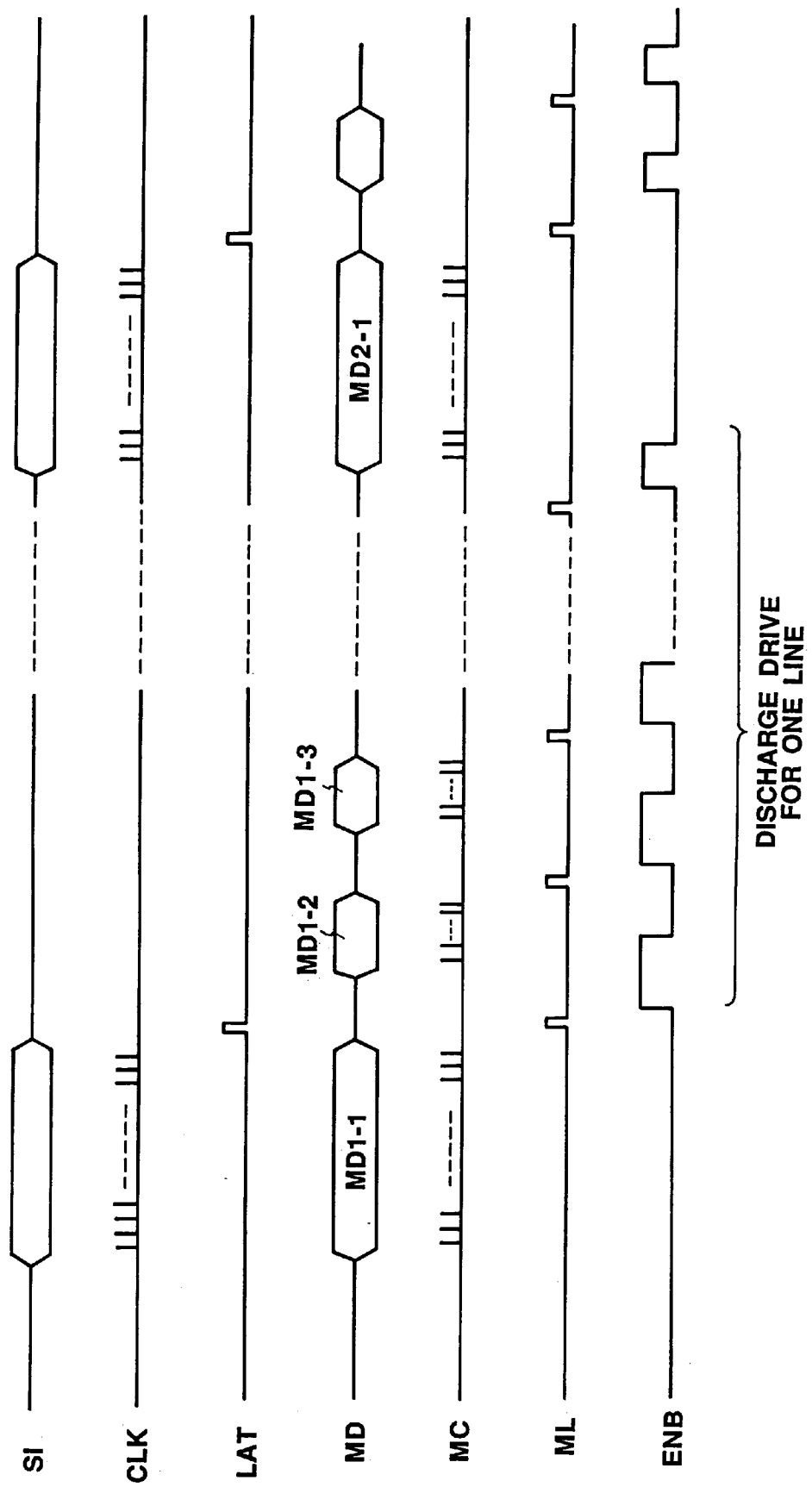
FIG. 18 is a timing chart illustrating drive timings in the fifth embodiment.

In this embodiment, the time-division driving bit selecting data MD is latched and held in holding circuits 207 by a selecting data holding signal ML in accordance with the timings illustrated in FIG. 18. Hence, the head drive can be simultaneously performed by enable signal EUB with the shift operation of the bit selecting data MD in the bit selecting circuits 206 by the clock signal MC. Thus, this embodiment can speed up the head driving in comparison with the fourth embodiment.

Although the time-division driving bit selecting data MD has the same bit number as the electrothermal energy converting elements 1 in this embodiment, the number of the data MD can be reduced by driving a plurality of electrothermal energy converting elements by using the same time-division driving bit selecting data.

Embodiment 6

Figure 19:
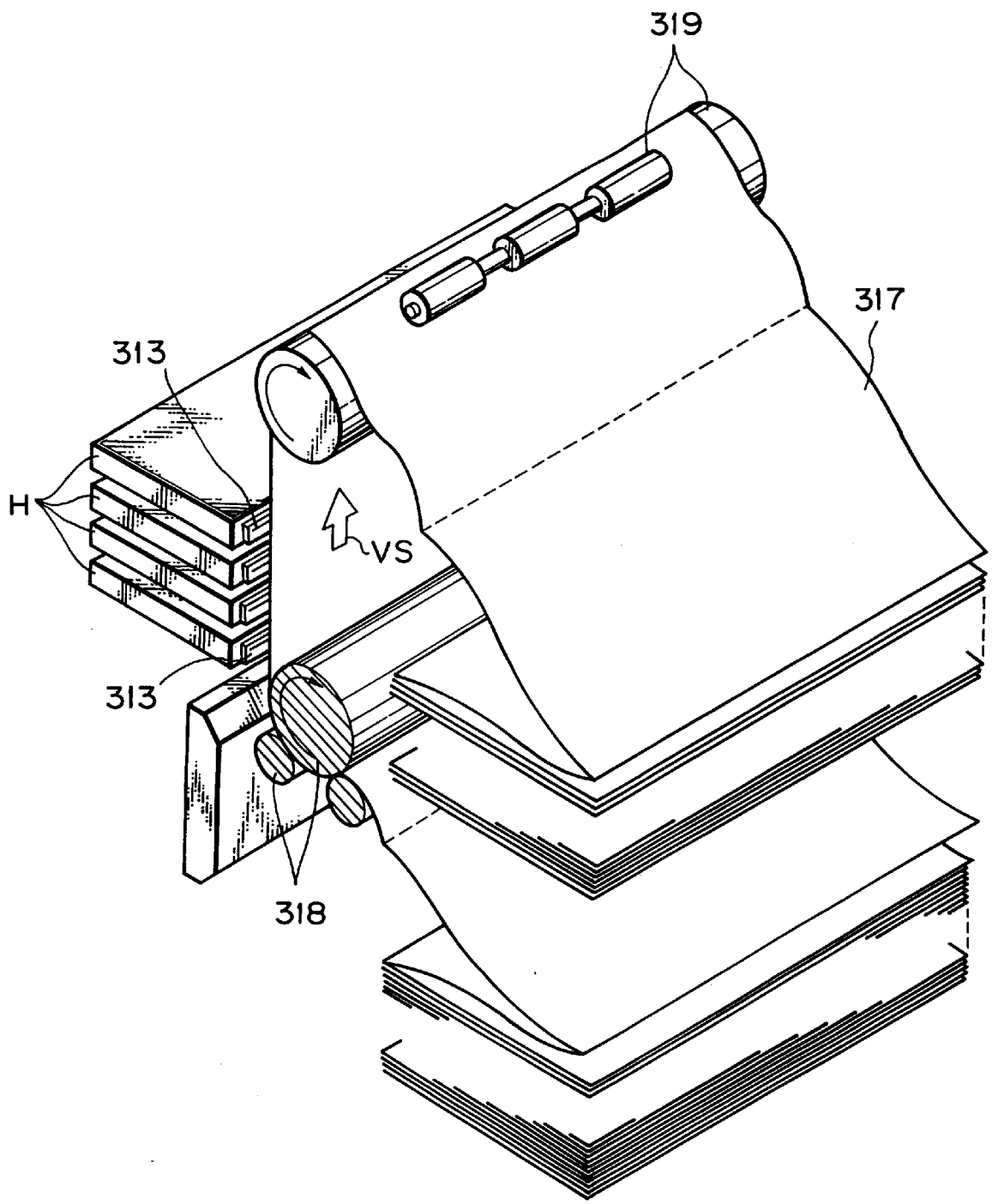
FIG. 19 is a perspective view showing the structure of a multi-color ink jet recording apparatus in accordance with a sixth embodiment of the present invention.

FIG. 19 shows a multi-color ink jet recording apparatus which employs the above described driving methods.

Fan-fold paper 317 is held at the recording position with sheet transport rollers 318 and contact rollers 319 at the exit. Against the fan-fold paper 317, is laterally disposed a full-line type ink jet recording head system H comprising cyan, magenta, yellow and black heads.

All the embodiments described above can be applied to each of the cyan, magenta, yellow and black heads of the full-line type ink jet recording head system H of the multi-color ink jet recording apparatus, thereby achieving the same operation and effect of these embodiments.

Supplements

The present invention achieves distinct effects when applied to a recording head or a recording apparatus which has means for generating thermal energy such as electrothermal transducers or laser light, and which causes changes in ink by the thermal energy so as to eject ink. This is because such a system can achieve a high density and high resolution recording.

A typical structure and operational principle thereof is disclosed in U.S. Pat. Nos. 4,723,129 and 4,740,796, and it is preferable to use this basic principle to implement such a system. Although this system can be applied either to on-demand type or continuous type ink jet recording systems, it is particularly suitable for the on-demand type apparatus. This is because the on-demand type apparatus has electrothermal transducers, each disposed on a sheet or liquid passage that retains liquid (ink), and operates as follows: first, one or more drive signals are applied to the electrothermal transducers to cause thermal energy corresponding to recording information; second, the thermal energy induces sudden temperature rise that exceeds the nucleate boiling so as to cause the film boiling on heating portions of the recording head; and third, bubbles are grown in the liquid (ink) corresponding to the drive signals. By using the growth and collapse of the bubbles, the ink is expelled from at least one of the ink ejection orifices of the head to form one or more ink drops. The drive signal in the form of a pulse is preferable because the growth and collapse of the bubbles can be achieved instantaneously and suitably by this form of drive signal. As a drive signal in the form of a pulse, those described in U.S. Pat. Nos. 4,463,359 and 4,345,262 are preferable. In addition, it is preferable that the rate of temperature rise of the heating portions described in U.S. Pat. No. 4,313,124 be adopted to achieve better recording.

U.S. Pat. Nos. 4,558,333 and 4,459,600 disclose the following structure of a recording head, which is incorporated to the present invention: this structure includes heating portions disposed on bent portions in addition to a combination of the ejection orifices, liquid passages and the electrothermal transducers disclosed in the above patents. Moreover, the present invention can be applied to structures disclosed in Japanese Laid-Open Patent Application Nos. 123670/1984 and 138461/1984 in order to achieve similar effects. The former discloses a structure in which a slit common to all the electrothermal transducers is used as ejection orifices of the electrothermal transducers, and the latter discloses a structure in which openings for absorbing pressure waves caused by thermal energy are formed corresponding to the ejection orifices. Thus, irrespective of the type of the recording head, the present invention can achieve recording positively and effectively.

The present invention can be also applied to a so-called full-line type recording head whose length equals the maximum length across a recording medium. Such a recording head may consist of a plurality of recording heads combined together, or one integrally arranged recording head.

In addition, the present invention can be applied to various serial type recording heads: a recording head fixed to the main assembly of a recording apparatus; a conveniently replaceable chip type recording head which, when loaded on the main assembly of a recording apparatus, is electrically connected to the main assembly, and is supplied with ink therefrom; and a cartridge type recording head integrally including an ink reservoir.

It is further preferable to add a recovery system, or a preliminary auxiliary system for a recording head as a constituent of the recording apparatus because they serve to make the effect of the present invention more reliable. Examples of the recovery system are a capping means and a cleaning means for the recording head, and a pressure or suction means for the recording head. Examples of the preliminary auxiliary system are a preliminary heating means utilizing electrothermal transducers or a combination of other heater elements and the electrothermal transducers, and a means for carrying out preliminary ejection of ink independently of the ejection for recording. These systems are effective for reliable recording.

The number and type of recording heads to be mounted on a recording apparatus can be also changed. For example, only one recording head corresponding to a single color ink, or a plurality of recording heads corresponding to a plurality of inks different in color or concentration can be used. In other words, the present invention can be effectively applied to an apparatus having at least one of the monochromatic, multi-color and full-color modes. Here, the monochromatic mode performs recording by using only one major color such as black. The multi-color mode carries out recording by using different color inks, and the full-color mode performs recording by color mixing.

Furthermore, although the above-described embodiments use liquid ink, inks that are liquid when the recording signal is applied can be used: for example, inks can be employed that solidify at a temperature lower than the room temperature and are softened or liquefied in the room temperature. This is because in the ink jet system, the ink is generally temperature adjusted in a range of 30° C.–70° C. so that the viscosity of the ink is maintained at such a value that the ink can be ejected reliably.

In addition, the present invention can be applied to such apparatus where the ink is liquefied just before the ejection by the thermal energy as follows so that the ink is expelled from the orifices in the liquid state, and then begins to solidify on hitting the recording medium, thereby preventing the ink evaporation: the ink is transformed from solid to liquid state by positively utilizing the thermal energy which would otherwise cause the temperature rise; or the ink, which is dry when left in air, is liquefied in response to the thermal energy of the recording signal. In such cases, the ink may be retained in recesses or through holes formed in a porous sheet as liquid or solid substances so that the ink faces the electrothermal transducers as described in Japanese Laid-Open Patent Application Nos. 56847/1979 or 71260/1985. The present invention is most effective when it uses the film boiling phenomenon to expel the ink.

Furthermore, the ink jet recording apparatus of the present invention can be employed not only as an image output terminal of an information processing device such as a computer, but also as an output device of a copying machine including a reader, and as an output device of a facsimile apparatus having a transmission and receiving function.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A recording head system for an ink jet recording apparatus which performs recording in accordance with recording data, said system comprising:

a recording head including a plurality of discharging portions for discharging ink, a plurality of ink passages each of which communicates to one of said discharging portions, a common ink chamber for storing ink supplied to said ink passages, and a plurality of ejecting means each of which is disposed in one of said ink passages for discharging ink droplets from said discharging portions in response to the recording data, said plurality of ejecting means being divided into two or more blocks;

comparing means for comparing a number of said ejecting means to be driven in each of the blocks in accordance with the recording data to a predetermined reference number, which is an average number of said ejecting means to be driven in each of the blocks, to obtain a result of comparison of the number of said ejecting means to the predetermined reference number in each of the blocks; and control means for controlling timings of driving of the blocks such that 1) an interval between driving a first block and driving a second block next to the first block is determined in accordance with the result of comparison of the first block generated by said comparing means, and 2) a variation in an amount of ink ejected by driving the second block, which variation is caused by driving the first block, is decreased relative to an amount of ink elected when driving the average number of said electing means in the second block.

2. A recording head system for an ink jet recording apparatus as claimed in claim 1, wherein said recording head is a full-line recording head having a center, and said control means controls intervals between the drivings of adjacent blocks near the center of said recording head to be longer than intervals between the drivings of adjacent blocks near ends of said recording head.

3. A recording head system for an ink jet recording apparatus as claimed in claim 1, wherein each of said plurality of ejecting means comprises an electrothermal energy converting element which converts electric current into thermal energy to form bubbles in ink.

4. A recording head system for an ink jet recording apparatus as claimed in claim 1, wherein said discharging portions comprises nozzles.

5. A recording head system as claimed in claim 1, wherein said ejecting means is divided into three or more blocks including centrally-disposed blocks disposed centrally of said recording head, said control means controls timings of driving of the blocks such that an interval between driving any two adjacent blocks, other than the centrally-disposed blocks, is less than an interval between driving two adjacent blocks among the centrally-disposed blocks of said recording head.

6. A copy machine comprising:
   a reader for reading recording data; and
   an ink jet recording head system for recording in accordance with recording data, said system comprising:
      a recording head including a plurality of discharging portions for discharging ink, a plurality of ink passages each of which communicates to one of said discharging portions, a common ink chamber for storing ink supplied to said ink passages, and a plurality of ejecting means each of which is disposed in one of said ink passages for discharging ink droplets from said discharging portions in response to the recording data, said plurality of ejecting means being divided into two or more blocks,
      comparing means for comparing a number of said ejecting means to be driven in each of the blocks in accordance with the recording data to a predetermined reference number, which is an average number of said electing means to be driven in each of the blocks, to obtain a result of comparison of the number of said ejecting means to the predetermined reference number in each of the blocks, and
      control means for controlling timings of driving of the blocks such that 1) an interval between driving a first block and driving a second block next to the first block is determined in accordance with the result of comparison of the first block generated by said comparing means, and 2) a variation in an amount of ink ejected by driving the second block, which variation is caused by driving the first block, is decreased relative to an amount of ink ejected when driving the average number of said electing means in the second block.

7. A copy machine as claimed in claim 6, wherein said ejecting means is divided into three or more blocks including centrally-disposed blocks disposed centrally of said recording head, said control means controls timings of driving of the blocks such that an interval between driving any two adjacent blocks, other than the centrally-disposed blocks, is less than an interval between driving two adjacent blocks among the centrally-disposed blocks of said recording head.

8. A facsimile machine comprising:
   means for transmitting and receiving data; and
   an ink jet recording head system for recording in accordance with received data, said system comprising:
      a recording head including a plurality of discharging portions for discharging ink, a plurality of ink passages each of which communicates to one of said discharging portions, a common ink chamber for storing ink supplied to said ink passages, and a plurality of ejecting means each of which is disposed in one of said ink passages for discharging ink droplets from said discharging portions in response to the recording data, said plurality of ejecting means being divided into two or more blocks,
      comparing means for comparing a number of said ejecting means to be driven in each of the blocks in accordance with the recording data to a predetermined reference number, which is an average number of said erecting means to be driven in each of the blocks, to obtain a result of comparison of the number of said ejecting means to the predetermined reference number in each of the blocks, and
      control means for controlling timings of driving of the blocks such that 1) an interval between driving a first block and driving a second block next to the first block is determined in accordance with the result of comparison of the first block generated by said comparing means, and such that 2) a variation in an amount of ink ejected by driving the second block, which variation is caused by driving the first block, is decreased relative to an amount of ink ejected when driving the average number of said electing means in the second block.

9. A facsimile machine as claimed in claim 8, wherein said ejecting means is divided into three or more blocks including centrally-disposed blocks disposed centrally of said recording head, said control means controls timings of driving of the blocks such that an interval between driving any two adjacent blocks, other than the centrally-disposed blocks, is less than an interval between driving two adjacent blocks among the centrally-disposed blocks of said recording head.

10. A head drive method for an ink jet recording apparatus which performs recording in accordance with recording data by using a recording head including a plurality of discharging portions for discharging ink, a plurality of ink passages each of which communicates to one of the discharging portions, a common ink chamber for storing ink supplied to the ink passages, and a plurality of ejecting means each of which is disposed in one of the ink passages for discharging ink droplets from the discharging portions in response to the recording data, the plurality of ejecting means being divided into two or more blocks, said method comprising the steps of:
   driving a first block;
   comparing a number of the ejecting means to be driven in the first block in accordance with the recording data to a predetermined reference number, which is an average number of the ejecting means to be driven in each of the blocks, to obtain a result of comparison of the number of the ejecting means to the predetermined reference number in the first block;

determining an interval between a drive timing of the first block and a drive timing of a second block in accordance with the result of comparison of said comparing step;

driving the second block after the interval has elapsed from the drive timing of the first block; and repeating said comparing step, determining step and driving step for remaining blocks of the recording head, such that a variation in an amount of ink ejected by driving the second block, which variation is caused by driving the first block, is decreased relative to an amount of ink ejected when driving the average number of the ejecting means in the second block.

11. A head drive method for an ink jet recording apparatus as claimed in claim 10, wherein the recording head is a full-line recording head, and intervals between the drive timings of adjacent blocks near the center of the recording head are longer than intervals between the drivings of adjacent blocks near ends of the recording head.

12. A head drive method for an ink jet recording apparatus as claimed in claim 11, further comprising the steps of detecting a position number of data to be recorded contained in one-line recording data, and controlling the drive timings in response to a detection in said detecting step.

13. A head drive method for an ink jet recording apparatus as claimed in claim 12, wherein a driving signal is not generated for a block including no recording data.

14. A head drive method for an ink jet recording apparatus as claimed in claim 10, wherein each of the ejecting means comprises an electrothermal energy converting element which converts electric current into thermal energy to form bubbles in ink.

15. A head drive method for an ink jet recording apparatus as claimed in claim 10, wherein said discharging portions comprise nozzles and in said driving steps ink is elected from the nozzles.

16. A head drive method for an ink jet recording apparatus as claimed in claim 10, further comprising a reading step, and the ink jet recording apparatus comprises a copy machine.

17. A head drive method for an ink jet recording apparatus as claimed in claim 10, further comprising transmitting and receiving steps, and the ink jet recording apparatus comprises a facsimile machine.

18. A head drive method as claimed in claim 10, wherein the ejecting means is divided into three or more blocks including centrally-disposed blocks disposed centrally of the recording head, said repeating step repeats such that an interval between driving any two adjacent blocks, other than the centrally-disposed blocks, is less than an interval between driving two adjacent blocks among the centrally-disposed blocks of the recording head.

19. A recording head system for an ink jet recording apparatus which performs recording in accordance with recording data, said system comprising:

a recording head including a plurality of discharging portions for discharging ink, a plurality of ink passages each of which communicates to one of said discharging portions, a common ink chamber for storing ink supplied to said ink passages, and a plurality of ejecting means each of which is disposed in one of said ink passages for discharging ink droplets from said discharging portions in response to the recording data;

driving means for driving said ejecting means, while dividing said ejecting means into three or more blocks including centrally-disposed blocks disposed centrally of said recording head; and control means for controlling drive timings of the blocks such that an interval between drive timings of two adjacent blocks, which are closer to the centrally-disposed blocks than other two adjacent blocks is longer than an interval between drive timings of said other two adjacent blocks.

20. A recording head system as claimed in claim 19, wherein said plurality of ejecting means comprise thermal elements which generate heat for discharging the ink.

21. An ink jet recording apparatus for performing recording on a recording medium in accordance with recording data, said apparatus comprising:

a recording head including a plurality of discharging portions for discharging ink, a plurality of ink passages each of which communicates to one of said discharging portions, a common ink chamber for storing ink supplied to said ink passages, and a plurality of ejecting means each of which is disposed in one of said ink passages for discharging ink droplets from said discharging portions in response to the recording data;

driving means for driving said ejecting means, while dividing said ejecting means into three or more blocks including centrally-disposed blocks disposed centrally of said recording head;

control means for controlling drive timings of the blocks such that an interval between drive timings of two adjacent blocks, which are closer to the centrally-disposed blocks than other two adjacent blocks is longer than an interval between drive timings of said other two adjacent blocks; and means for transporting a recording medium to be recorded with ink discharged from said recording head.

22. An ink jet recording apparatus as claimed in claim 21, wherein said plurality of ejecting means comprise thermal elements which generate heat for discharging the ink.

* * * * *

UNITED STATES PATENT AND TRADEMARK OFFICE
CERTIFICATE OF CORRECTION

PATENT NO. : 6,102,510
DATED : August 15, 2000
INVENTOR(S) : Kikuta et al.

It is certified that error appears in the above-identified patent and that said Letters Patent is hereby corrected as shown below:

Title page,
Item [57] ABSTRACT,
Line 10, "vise" should read -- vice --.

Column 2,
Line 60, "on" should read -- of --.

Column 4,
Line 14, "facsimile" should read -- facsimile machine --.

Column 5,
Line 30, "facsimile" should read -- facsimile machine --.
Line 54, "facsimile" should read -- facsimile machine --.

Column 7,
Line 17, "is" should be deleted.
Line 22, "it equal" should read -- it is equal --.

Column 9,
Line 32, "nth line" should read -- n-th line --.

Column 13,
Line 9, "elected" should read -- ejected --.
Line 10, "electing" should read -- ejecting --.
Line 25, "comprises" should read -- comprise --.
Line 53, "electing" should read -- ejecting --.
Line 67, "electing" should read -- ejecting --.

UNITED STATES PATENT AND TRADEMARK OFFICE
CERTIFICATE OF CORRECTION

PATENT NO.    : 6,102,510
DATED         : August 15, 2000
INVENTOR(S)   : Kikuta et al.

It is certified that error appears in the above-identified patent and that said Letters Patent is hereby corrected as shown below:

Column 14,
Line 27, "erecting" should read -- ejecting --.
Line 41, "electing" should read -- ejecting --.

Column 15,
Line 39, "elected" should read -- ejected --.

Signed and Sealed this

Twenty-third Day of October, 2001

*Attest:*

*Attesting Officer*

NICHOLAS P. GODICI
*Acting Director of the United States Patent and Trademark Office*